US009917669B2

(12) United States Patent
Wu et al.

(10) Patent No.: US 9,917,669 B2
(45) Date of Patent: Mar. 13, 2018

(54) ACCESS POINT AND COMMUNICATION SYSTEM FOR RESOURCE ALLOCATION

(71) Applicant: National Chiao Tung University, Hsinchu (TW)

(72) Inventors: Sau-Hsuan Wu, New Taipei (TW); Hsi-Lu Chao, Taipei (TW); Chun-Hsien Ko, Taipei (TW)

(73) Assignee: National Chiao Tung University, Hsinchu (TW)

( * ) Notice: Subject to any disclaimer, the term of this patent is extended or adjusted under 35 U.S.C. 154(b) by 162 days.

(21) Appl. No.: 14/465,849

(22) Filed: Aug. 22, 2014

(65) Prior Publication Data
US 2015/0055633 A1    Feb. 26, 2015

Related U.S. Application Data

(60) Provisional application No. 61/870,061, filed on Aug. 26, 2013.

(51) Int. Cl.
*H04W 4/00*    (2009.01)
*H04J 3/16*    (2006.01)
(Continued)

(52) U.S. Cl.
CPC ........... *H04J 3/1694* (2013.01); *H04W 16/04* (2013.01); *H04W 24/02* (2013.01);
(Continued)

(58) Field of Classification Search
USPC ....... 370/230, 235, 252, 254, 321, 328–330, 370/336–337
See application file for complete search history.

(56) References Cited

U.S. PATENT DOCUMENTS

| 5,603,082 A * | 2/1997 | Hamabe ............... H04W 16/10 455/450 |
| 2006/0109799 A1 * | 5/2006 | Tseng ..................... H04L 45/02 370/254 |

(Continued)

FOREIGN PATENT DOCUMENTS

| WO | 2012044148 | 4/2012 |
| WO | 2012167496 | 12/2012 |

(Continued)

OTHER PUBLICATIONS

K. Chen, et al, "C-RAN: The Road Towards Green RAN, White Paper Version 2.5," China Mobile Research Institute, Oct. 2011, available at http://labs.chinamobile.com/cran/.

(Continued)

*Primary Examiner* — Yemane Mesfin
*Assistant Examiner* — Mon Cheri Davenport
(74) *Attorney, Agent, or Firm* — JCIPRNET

(57) ABSTRACT

An access point (AP) and a communication system are provided. The access point comprises at least but not limited to a transceiver, a network connection unit, and a processing circuit. The processing circuit is configured for the following steps. The AP receives channel access requests of the user equipments (UEs) from the UEs. Next, the AP transmits a channel request data according to QoS requirements of plurality of channel access requests of the UEs to the server. Afterward, the AP receives resource allocation information associated with the channel request data from the server, wherein the resource allocation information comprises an allocated result of physical channels and transmission power configurations. Subsequently, the AP allocates the physical channels to the UEs according to the QoS requirements of the channel access requests of the UEs and the resource allocation information.

15 Claims, 6 Drawing Sheets

(51) Int. Cl.

| | |
|---|---|
| H04W 52/26 | (2009.01) |
| H04W 72/04 | (2009.01) |
| H04W 72/08 | (2009.01) |
| H04W 52/34 | (2009.01) |
| H04W 24/02 | (2009.01) |
| H04W 16/04 | (2009.01) |
| H04W 28/16 | (2009.01) |
| H04W 16/14 | (2009.01) |
| H04W 84/04 | (2009.01) |

(52) U.S. Cl.
CPC ....... *H04W 52/265* (2013.01); *H04W 52/346* (2013.01); *H04W 72/0413* (2013.01); *H04W 72/087* (2013.01); *H04W 16/14* (2013.01); *H04W 28/16* (2013.01); *H04W 84/045* (2013.01)

(56) References Cited

U.S. PATENT DOCUMENTS

| | | | |
|---|---|---|---|
| 2007/0026868 A1* | 2/2007 | Schulz | H04M 3/2227 455/454 |
| 2014/0031049 A1 | 1/2014 | Sundaresan et al. | |
| 2014/0071847 A1* | 3/2014 | Pantelidou | H04L 1/00 370/252 |

FOREIGN PATENT DOCUMENTS

| | | |
|---|---|---|
| WO | 2013006200 | 1/2013 |
| WO | 2013048526 | 4/2013 |
| WO | 2013125918 | 8/2013 |

OTHER PUBLICATIONS

Karthikeyan Sundaresan, et al., "FluidNet: A Flexible Cloud-based Radio Access Network for Small Cells," ACM MobiCom, Proceedings of the 19th annual international conference on Mobile computing & networking, Sep. 2013, pp. 99-110.

Cheng Liu, et al., "The Case for Re-configurable Backhaul in Cloud-RAN based Small Cell Networks," INFOCOM, 2013 Proceedings IEEE, Apr. 2013, pp. 1124-1132.

Edited by Claudio Cicconetti, "5G radio network architecture," European Commission, Radio Access and Spectrum Cluster Projects, 2013, availible at http://www.ictras.eu/.

Sau-Hsuan Wu, et al. "Green Spectrum Sharing in a Cloud-Based Cognitive Radio Access Network," IEEE GreenCom 2013, Aug. 20-23, 2013, pp. 276-281.

Hsi-Lu Chao, et al., "Cooperative Spectrum Sharing and Scheduling in Self-Organizing Femtocell Networks," IEEE ICC, 2014, pp. 1-6.

* cited by examiner

|       | l= 1 | 2 | 3 |
|-------|------|---|---|
| C2,1-th | 1 | 0 | 1 |
| C2,2-th | 0 | 1 | 0 |
| C2,3-th | 0 | 0 | 1 |
FIG. 5A
UE (i,j)
|       | | | |
|-------|---|---|---|
| C1,1-th | 1 | 0 | 1 |
| C1,2-th | 0 | 1 | 0 |
UE (i',j')
|       | | | |
|-------|---|---|---|
| C2,1-th | 1 | 0 | 1 |
| C2,2-th | 0 | 1 | 0 |
FIG. 5B
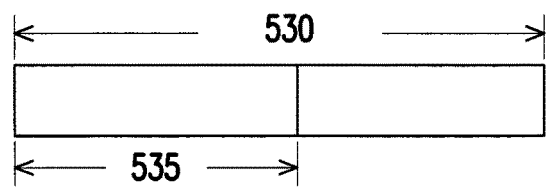
FIG. 5C
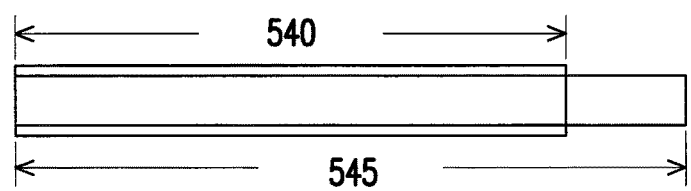
FIG. 5D

ACCESS POINT AND COMMUNICATION SYSTEM FOR RESOURCE ALLOCATION

CROSS REFERENCE TO RELATED APPLICATION

This application claims the priority benefit of U.S. provisional application Ser. No. 61/870,061, filed on Aug. 26, 2013. The entirety of the above-mentioned patent application is hereby incorporated by reference herein and made a part of specification.

BACKGROUND OF THE INVENTION

1. Field of the Invention

The present invention generally relates to a technology of resource allocation in small-cell networks, in particular, to an access point (AP) and a communication system for resource allocation in small-cell networks.

2. Description of Related Art

The explosive growth of mobile broadband wireless services have driven and expedited the deployment of the Third Generation Partnership Project (3GPP) LTE (Long Term Evolution) networks. The global mobile broadband subscriptions and the global mobile data traffic have been growing exponentially in the last few years. To support the exponentially growing mobile data traffic, not only is the wireless bandwidth a major concern, the power consumption is also becoming a challenging issue. Statistics show that, the total power consumption to support an operator's hundreds of millions of subscribers is over ten billion kilowatt hours, wherein about 70 percent of the power is used by the base stations (BSs).

To meet the bandwidth demands with an environmental friendly transmission technology, an emerging idea is to deploy large numbers of low-power and low cost femtocell BSs or access points (APs) in metropolitan areas, and coordinate the transmissions of the tens of thousands of BSs/APs using a cloud-based radio access network (C-RAN). Unlike typical RANs where the baseband units (BBUs) and the radio function units are situated together, the C-RAN separates the radio function units (also referred to as the remote radio heads (RRHs)) from the BBUs, wherein the RRHs are deployed with antennas at the remote site of a small-cell, and a pool of BBUs (in a data center cloud) are run by high performance and digital signal processing (DSP) processors. With pervasive self-organizing networks (SON) of femto APs, not only the data rate and power efficiency of wireless transmissions can be substantially increased, spectral usage can also be improved by applying joint radio resource management and cooperative multipoint processing (CoMP) technologies.

SUMMARY OF THE INVENTION

Accordingly, the present invention is directed to an access point and a communication system for resource allocation, which could provide efficient resource usage and data transmission.

The invention provides an access point (AP). The access point comprises at least but not limited to a transceiver, a network connection unit, and a processing circuit. The transceiver is used for transmitting and receiving wireless data. The network connection unit is used for transmitting and receiving control data. Furthermore, the processing circuit coupled to the transceiver and the network connection unit and is configured for the following steps. Channel access requests of UEs are received using the transceiver. A channel request data transformed from the channel access requests of UEs according to quality of service (QoS) requirements of channel access requests is transmitted using the network connection unit. Resource allocation information associated with the channel request data is received using the network connection unit, wherein the resource allocation information comprises an allocated result of physical channels and transmission power configurations. The physical channels are allocated to the UEs according to the QoS requirements of the channel access requests of the UEs and the resource allocation information.

In an embodiment of the invention, wherein the channel request data comprises utility requests of sectors, and the processing circuit is further configured for the following step. The channel access requests of the UEs are transformed into the utility requests of sectors according location data of the UEs and the QoS requirements of the channel access requests of the UEs.

In an embodiment of the invention, wherein the number of the sectors is N, N is a positive integer, and the processing circuit is further configured for the following step. The UEs are grouped into N sectors according to the location data of the UEs.

In an embodiment of the invention, wherein the channel access requests of the UEs are corresponded to M service types, M is a positive integer, and the processing circuit is further configured for the following steps. Transmission rate requirements of the M service types corresponding to the QoS requirements of the channel access requests of the UEs are mapped to capacities of the physical channels. Next, numbers of required physical channels of the M service types in each of the sectors are calculated as numbers of the utility requests of sectors according to mapped results.

In an embodiment of the invention, wherein the processing circuit is further configured for the following steps. A bandwidth requirement of each of the M service types in each of the sectors is calculated according to the transmission rate requirements of the M service types and amounts of the channel access requests of the UEs for the M service types. An offered capacity of each of the capacities of the physical channels mapped with the each of the M service types in each of the sectors is calculated. Afterwards, the numbers of required physical channels of the each of M service types of each of the sectors are calculated in a order of the M service types according to the bandwidth requirement of each of the M service types and offered capacity of each of the capacities of the physical channels mapped with the each of the M service types, wherein the order of the M service types is arranged according to the transmission rate requirements of the M service types.

In an embodiment of the invention, wherein the processing circuit is further configured for the following step. The allocated physical channels with the transmission power configurations to the UEs are assigned in the manner of time division multiplexing.

In an embodiment of the invention, wherein the processing circuit is further configured for the following step. A service guarantee degree is determined, wherein the service guarantee degree is based on the ratio of an allocated bandwidth of all capacities of the physical channels to the required physical channel bandwidth of each of the channel access requests of the UEs. The physical channels are allocated to the channel access requests of UEs according to the service guarantee degree.

In an embodiment of the invention, wherein the processing circuit is further configured for the following step. A utilization degree is determined, wherein the utilization degree is based on the ratio of the allocated bandwidth of all capacities of the allocated physical channels to the required physical channel bandwidth of each of the channel access requests of the UEs. The plurality of physical channels for the plurality of channel access requests of the plurality of UEs are allocated according to the utilization degree.

In an embodiment of the invention, wherein the processing circuit is further configured for the following step. A sum utility corresponding to the channel access requests of the UEs is maximized according to the physical channels and the QoS requirements of the channel access requests of UEs, so as to allocate the physical channels to the UEs according to the maximized result.

In an embodiment of the invention, wherein the processing circuit is further configured for the following step. The wireless data corresponding to the channel access requests of the UEs is transmitted using the transmission power configurations on each of the allocated physical channels.

This invention provides a communication system that includes APs, a server, and UEs. The APs are coupled to the server. Each of the APs receives channel access requests of the UEs from the UEs, transmits a channel request data transformed from the channel access requests of the UEs according to QoS requirements of channel access requests of the UEs to the server, and receives resource allocation information associated with the channel request data from the server, wherein the resource allocation information comprises an allocated result of physical channels and transmission power configurations. Each of the APs then allocates the physical channels to the UEs according to the QoS requirements of the channel access requests of the UEs and the resource allocation information.

In an embodiment of the invention, wherein the channel request data comprises utility requests of sectors, and each of the APs transforms the channel access requests of the UEs into the utility requests of sectors according to the location data and the QoS requirements of the channel access requests of the UEs.

In an embodiment of the invention, wherein the number of the sectors is N, N is a positive integer, and the each of the APs groups the UEs into N sectors according to the location data of the UEs.

In an embodiment of the invention, wherein the channel access requests of the UEs is corresponding to M service types, M is a positive integer, and the each of the APs maps transmission rate requirements of the M service types corresponding to the QoS requirements of the channel access requests of the UEs with capacities of the physical channels, and calculates numbers of required physical channels of the M service types in each of the sectors as numbers of the utility requests of sectors according to mapped results.

In an embodiment of the invention, wherein each of the APs calculates a bandwidth requirement of each of the M service types in each of the sectors according to the transmission rate requirements of the M service types and amounts of the channel access requests of the UEs for the M service types, calculates an offered capacity of each of the capacities of the physical channels mapped with the each of the M service types in each of the sectors, and calculates the numbers of required physical channels of the each of M service types in a order of the M service types of each of the sectors according to the bandwidth requirement of each of the M service types and the offered capacity of each of the capacities of the physical channels mapped with the each of the M service types, wherein the order of the M service types is arranged according to the transmission rate requirements of the M service types.

In an embodiment of the invention, wherein each of the APs assigns the physical channels with the capacities of the transmission power configurations to the UEs in the manner of time division multiplexing.

In an embodiment of the invention, wherein each of the APs determines a service guarantee degree, wherein the service guarantee degree is based on the ratio of the allocated bandwidth of all capacities of the allocated physical channels to a required physical channel bandwidth of each of the channel access requests of the UEs. Each of the APs allocates the physical channels for the channel access requests of the UEs according to the service guarantee degree.

In an embodiment of the invention, wherein each of the APs determines a utilization degree, wherein the utilization degree is based on the ratio of the required physical channel bandwidth of each of the channel access requests of the UEs to the allocated bandwidth of all capacities of the allocated physical channels. Each of the APs allocates the physical channels for the channel access requests of the UEs according to the utilization degree.

In an embodiment of the invention, wherein each of the APs maximizes the sum utility corresponding to the channel access requests of the UEs according to the physical channels and the QoS requirements of the channel access requests of the UEs, so as to allocate the physical channels to the UEs according to the maximized result.

In an embodiment of the invention, wherein each of the APs transmits the wireless data of the channel access requests of the UEs using the transmission power configurations on each of the allocated physical channels.

Based on the above descriptions, the embodiments of the present invention provide an access point and a communication system. The AP transforms the channel access requests of the UEs to the channel request data comprising utility requests of sectors according to the QoS requirements of the channel access requests, and transmits the channel request data to the server. Next, the AP allocates the physical channels assigned by the server to the utility requests of sectors, and transmits with the UEs using transmission power configurations assigned by the server on each of the physical channels. Accordingly, the APs may not be affected by each other with the assigned transmission power configurations, and further reduce power consumption effectively. Besides, the spectrum and timeslot resources may be allocated more efficiently.

In order to make the aforementioned features and advantages of the present invention comprehensible, preferred embodiments accompanied with figures are described in detail below. It is to be understood that both the foregoing general description and the following detailed description are exemplary, and are intended to provide further explanation of the invention as claimed.

It should be understood, however, that this summary may not contain all of the aspect and embodiments of the present invention and is therefore not meant to be limited or restrictive in any manner. Also the present invention would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A~5D are examples illustrating operations of resource allocation with four constraints according to the embodiment of the invention.

DESCRIPTION OF THE EMBODIMENTS

Figure 1:
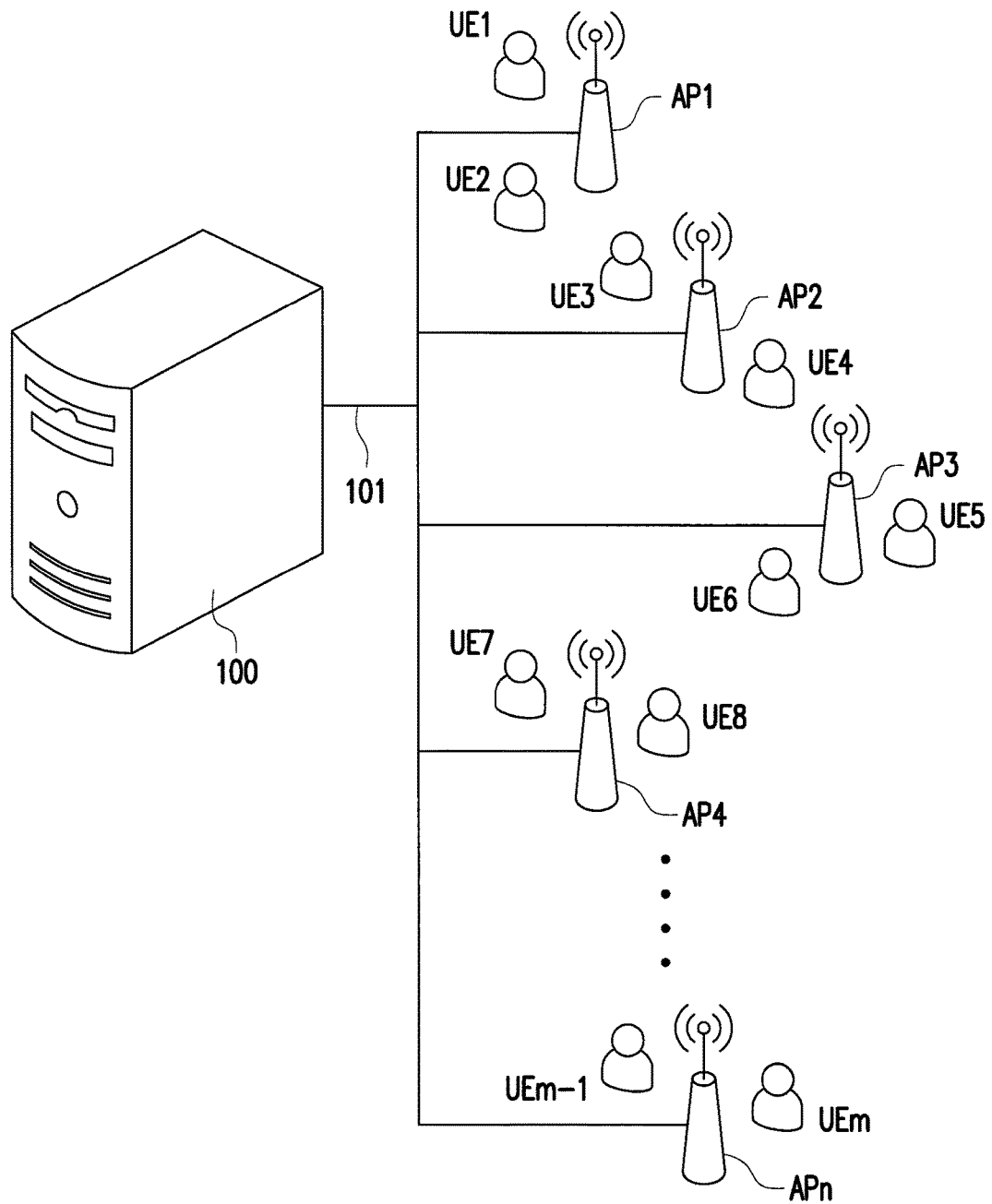
FIG. 1 is a schematic diagram illustrating a communication system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the architecture of a cloud-based radio access network (C-RAN), baseband processing with high computing requirement is moved to power-efficient cloud centers, so remote femtocell base stations (BSs) or access points (APs) controlled by the cloud centers may save more power than traditional BSs. In an exemplary embodiments of the present invention, the major difference between the traditional C-RAN and the invention is, the embodiments of the invention keeps baseband signal processing function, collecting bandwidth requests of UEs, and performing mechanism of user scheduling at APs, so as to reduce the computation complexity in the cloud server, and the application services requested by UEs may be provided with the guaranteed QoS requirements. In addition, the APs provide the application services using the transmission power configuration assigned by the cloud server, so that the co-channel interferences may thus be eliminated.

FIG. 1 is a schematic diagram illustrating a communication system according to an embodiment of the invention. In this embodiment, the communication system 10 comprises a server 100, APs AP1~APn, and UEs UE1~UEm, wherein the APs AP1~APn and UEs UE1~UEm of the embodiment are merely exemplary examples, in the other embodiment, the amount of the APs and the UEs (i.e. n and m) may be, for example but not limited to, ten thousand, two million, etc. . . . , and this invention is not limited thereto.

The server 100 may be a file server, a database server, an application server, a workstation, a personal computer, or other computing apparatuses having capable of computation, for example. The server 100 is coupled to the APs AP1~APn respectively through wired backhaul interface 101 (e.g. digital subscriber lines (DSL), cable, or fiber), to communicate with APs AP1~APn. The server 100 includes at least a processing unit (not shown) and at least a storage unit (not shown). The storage unit stores a plurality of subscriber registration information, APs' information, spectrum management data, and etc. The storage unit is, for example, a memory, a hard drive, or any element used for storing the above mentioned data. The processing unit is coupled to the storage unit. The processing unit is capable of accessing data stored in the storage unit. The processing unit may be a general purpose processor, a special purpose processor, a conventional processor, a digital signal processor, a plurality of microprocessors, a microprocessor combining one or more digital signal processor cores, a controller, a microcontroller, a application specific integrated circuit (ASIC), a FPGA, a DSP chips, any other kind of integrated circuit, a state machine, a processor based on an advanced RISC machine (ARM), or the like.

APs AP1~APn may be home node Bs (referred to as "NodeBs"), advanced nodeBs (referred to as "eNodeBs"), femto base stations, access points, for example. Each of APs AP1~APn may contain at least but not limited to a transceiver, an analog-to-digital (A/D) converter, a digital-to-analog (D/A) converter, a network connection unit, a processing unit, one or more antenna units, and a storage medium. The transceiver transmits downlink signals and receives uplink signals wirelessly. The transceiver may include functional elements to perform operations such as low noise amplifying, impedance matching, frequency mixing, down frequency conversion, filtering, amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing. The network connection unit may be supported Ethernet, optical fiber, or any other wired transmission function of network interface card or network connection chip. In the embodiment, each of APs AP1~APn connects with the server 100 using the network connection unit via wired backhaul interface 101, so as to transmit and receive control data to/from the server 100.

The processing unit is configured to process digital signal and to perform procedures related to the proposed method in accordance with exemplary embodiments of the present invention. Also, the processing unit may optionally be coupled to a memory unit to store programming codes, device configurations, a codebook, buffered or permanent data, and etc. The functions of the processing unit may be implemented using programmable units such as a microprocessor, a micro-controller, a field programmable gate array (FPGA) circuit, and etc. The functions of the processing unit may also be implemented with separate electronic devices or ICs, and the processing unit may also be implemented with either hardware or software.

Each of the UEs UE1~UEm may be a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Each of the UEs UE1~UEm may contain at least but not limited to a transmitter circuit, a receiver circuit, an analog-to-digital (A/D) converter, a digital-to-analog (D/A) converter, a processing circuit, one or more antenna units, and optionally a memory circuit. The memory circuit may store programming codes, device configurations, buffered or permanent data, codebooks, and etc. The processing circuit may also be implemented with either hardware or software. The function of each element of a UE would be similar to what was described for a base station and thus detailed descriptions for each element will not be repeated.

Figure 2:
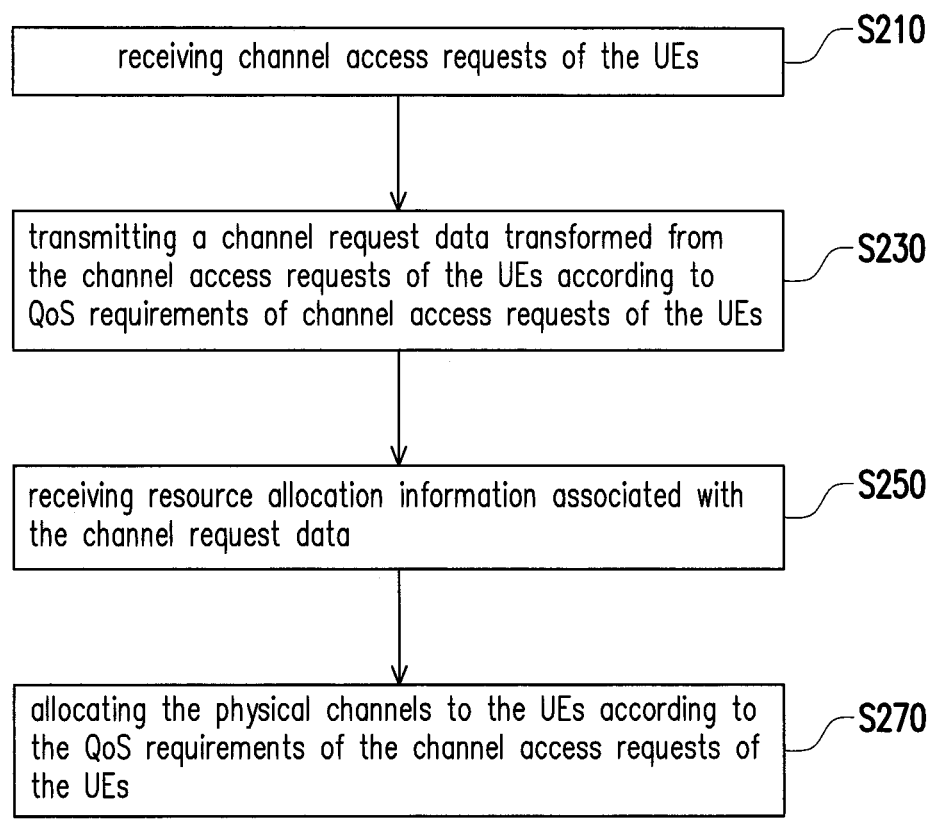
FIG. 2 is a flow chart illustrating a resource allocation method according to an embodiment of the invention.

FIG. 2 is a flow chart illustrating a resource allocation method according to an embodiment of the invention. The method disclosed in this embodiment may be executed by the processing units of the server 100, APs AP1~APn, and the UEs UE1~UEm in FIG. 1. Steps of the method of this embodiment are described with reference to the devices shown in FIG. 1 in the following discussions.

In Step S210, each of the APs AP1~APn receives channel access requests of the UEs (e.g. UE1, . . . , UEm) from the UEs. For example, assuming the APs AP1~APn provide Internet services (e.g. web-browsing, sending e-mail, and etc.) to UEs (e.g. smart phone, computer, and etc.) respectively in each coverage area of the APs AP1~APn. After the APs AP1~APn broadcast beacons or any control signals and perform association and authentication with the UEs, the UEs may send channel access requests (e.g. application service requests for resource blocks (RBs) in LTE, frequency bands (or bandwidth), timeslots, and etc.) for the Internet services.

In step S230, each of the APs AP1~APn transmits a channel request data transformed from the channel access requests of the UEs according to QoS requirements of channel access requests of the UEs to the server. In other words, each of the APs AP1~APn may collect the channel access requests of UEs located in the coverage area of the AP and aggregate the channel access requests of UEs into a channel request data.

In this embodiment, the channel request data comprises utility requests of sectors, and each of the APs AP1~APn transforms the channel access requests of the UEs into the utility requests of sectors according the location data of the UEs and the QoS requirements of the channel access requests of the UEs. In addition, the number of the sectors of each of the APs AP1~APn is N, N is a positive integer, and each of the APs AP1~APn groups the UEs into N sectors according to the location data of the UEs.

Figures 3, 4:
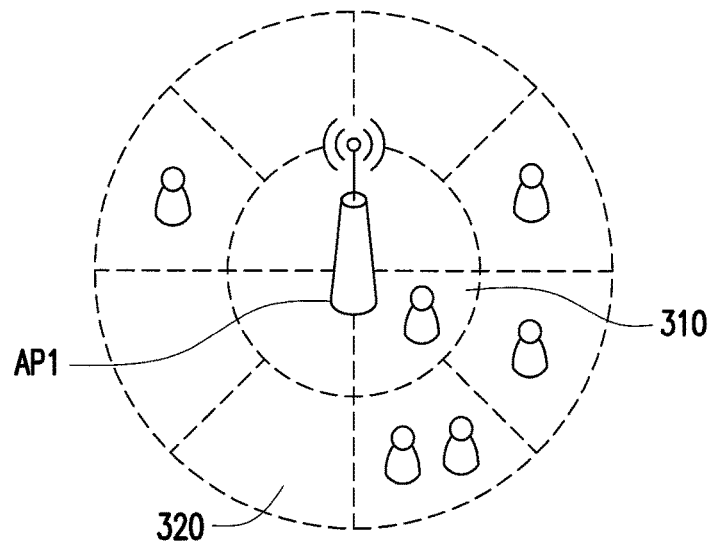
FIG. 3 is an example illustrating a coverage area of the AP1 of FIG. 1 according to an embodiment of the invention.
FIG. 4 is an example illustrating the operations of RB allocation for user (i,j) according to the embodiment of the invention.

Specifically, in order to make efficient use of available physical channels, and to make the computation on the server 100 with acceptable complexity, the coverage area of an AP (e.g. AP1, AP2, or etc.) is partitioned into several sectors. Taking AP1 of FIG. 1 as an example, FIG. 3 is an example illustrating a coverage area of the AP1 of FIG. 1 according to an embodiment of the invention. In this embodiment, the coverage area of the AP1 is grouped into 12 sectors as shown in FIG. 3, with four inner sectors 310 and eight outer sectors 320. AP1 may determine which one of the sectors that the channel access requests belonging to according to the location data of the UEs, wherein the location data may be coordinate values of global positioning system (GPS), longitude/latitude data, identifiers (IDs) of the UEs (e.g. UE1 or UE2), and/or distances and angles between the APs AP1~APn and UEs, for example. Channel access requests from a sector of the AP1 are first transformed into a number of sector utility (SU) requests (i.e. utility request of the sector) and corresponding to SINR requirements. Each SU request will occupy one physical channel, if granted, over the duration of a transmission time interval (TTI) in, for example but not limited to, the LTE media access control (MAC) frame format. As a result, each SU request may support a number of channel access requests issued by the same or different UEs in the same sector. Furthermore, it should be noted that the coverage area of the AP1 is merely an exemplary example, in the other the embodiment, number, shape, position, and size of each grouped sector of each of the APs AP1~APn may be different, and this invention is not limited thereto.

On the other hand, in a LTE-A femtocell system, as an example of the communication system 10, the available spectrum per channel is divided into resource blocks (RBs). Each RB consists of 12 adjacent subcarriers, and each subcarrier is 15 KHz. The time duration of a frame is denoted as T, which is known as transmission time interval (TTI), and the time duration of a RB is denoted as t. Herein, downlink transmissions are considered, and the downlink bandwidth per TTI is divided into z RBs. Since RB is the smallest resource unit, for the convenience of description, the channel data rate is named as "RB rate", and its unit is bits/RB. Next, assuming that the femtocell system has M physical channel capacities, and their capacities are presented as $C_1, \ldots, C_M$ in bits/RB, wherein $C_1 > C_2 > \ldots > C_M$.

In this embodiment, the channel access requests of the UEs UE1~UEm is corresponded to M service types, M is a positive integer, and the each of the APs AP1~APn maps transmission rate requirements of the M service types corresponding to the QoS requirements of the channel access requests of the UEs UE1~UEm to capacities of the physical channels (e.g. physical channel capacities $C_1 > C_2 > \ldots > C_M$), and calculates numbers of required physical channels of the M service types in each of the sectors as numbers of the utility requests of sectors according to mapped results.

Specifically, Internet services come in varying forms (e.g. web-browsing, e-mail, and multimedia on demand), and each service has its own QoS requirement (e.g. delay tolerance, traffic volume, interactivity, and etc.). In the embodiment, assuming there are M service types, and each service type is with a required downlink rate (i.e. transmission rate requirements) $r_i$, wherein i=1, M, and $r_1 > r_2 > \ldots > r_M$. Each service type is with a utility function which may be used for both real time and no-real time to represent its satisfaction. Besides, let $n_1, \ldots, n_M$ be the number of sessions for the M service classes (i.e. the number of UEs for the M service classes) in a specific sector.

Considering the issues of queue stability and QoS requirement of a session, the capacity of the allocated physical channel to the sessions of a specific service class must be equal or larger than the generated data rate. In this embodiment, assuming one-to-one mapping between session data rates (i.e. transmission rate requirements) and physical channel capacities, for example, $r_i$ is mapped to $C_i$, wherein i=1, . . . , M. However, in other embodiment, the request translation may be extended to one-to-many or many-to-one service classes and physical channel capacity mappings.

Conceptually, the sessions are translated in decreasing order of data rate. In other words, $r_1$-to-$C_1$ mapping is handled first, followed by $r_2$-to-$C_2$, . . . , and $r_M$-to-$C_M$ mappings. For example, there are four different service types, which are real time symmetric (e.g. voice over IP (VoIP)), real time asymmetric (e.g. Video), non-real time low load (e.g. web browsing), and non-real time high load (e.g. File Transfer Protocol (FTP)). The bandwidth requirements of these service types are 300 kbits rate per second (kbps), 4.5 Mbps, 1 Mbps, and 2 Mbps, respectively. Besides, the capacities of the physical channels mapped with these service types are 3 Mbps, 9 Mbps, 18 Mbps, and 27 Mbps, respectively.

Next, each of the APs AP1~APn calculates a bandwidth requirement of each of the M service types in each of the sectors according to the transmission rate requirements of the M service types and amounts of the channel access requests of the UEs for the M service types of each of the sectors, calculates an offered capacity of each of the capacities of the physical channels mapped with the each of the M service types in each of the sectors, and calculates the numbers of required physical channels of the each of M service types of each of the sectors in a order of the M service types according to the bandwidth requirement of each of the M service types and the offered capacity of each of the capacities of the physical channels mapped with the each of the M service types, wherein the order of the M service types is arranged according to the transmission rate requirements of the M service types.

To improve the channel utilization, the traffic volume of a specific service type which utilizes less than half of the mapped physical channel bandwidth will be counted in the translation of the next service type. Specifically, let $\delta_i$ represent the excessive traffic volume service class i that must be counted to service class i+1. It is obvious that $\delta_0 = 0$. For clarity description, it is defined that Round(x) be the function that returns the integer nearest to x (e.g. round off). The translation rules of physical channel mapping are listed in the following equation (1) and (2):

$$m_i = \begin{cases} \text{Round}\left(\frac{n_i r_i T + \delta_{i-1}}{C_i z t}\right), i = 1, \ldots, M-1 \\ \left\lceil \left(\frac{n_i r_i T + \delta_{i-1}}{C_i z t}\right)\right\rceil, i = M \end{cases} \quad (1)$$

$$\delta_i = \max[(n_i r_i T + \delta_{i-1} - m_i C_i z t), 0], i = 1, \ldots, M, \delta_0 = 0 \quad (2)$$

Begin from the highest transmission rate of physical channel (e.g. $r_1$), each of the APs AP1~APn may calculates a sum of all data flow of each of M service types in each of the sectors as the bandwidth requirement of each of the M service types in each of the sectors. Then, a traffic volume which a physical channel is capable of offering (i.e. offered capacity) is calculated, wherein capacity of the physical channel is mapped with a transmission rate requirement of a service type. Subsequently, the bandwidth requirement of each of the M service types is divided by the offered capacity of mapped with the each of the M service types in each of the sectors, so as to obtain the numbers of required physical channels of the each of M service types of each of the sectors. Table (1) is a mapping table of a sector, each of M service types of each of the sectors may be mapped to a number of the required physical channels.

TABLE (1)

| Capacities of the physical channels | number of the required physical channels | Remaining traffic volume |
|---|---|---|
| $C_1$ | $m_1$ | $\delta_1$ |
| $C_2$ | $m_2$ | $\delta_2$ |
| ... | ... | ... |
| $C_M$ | $m_M$ | $\delta_M$ |

The numbers of the utility requests of each of sectors is corresponding to the numbers of required physical channels of the each of M service types of each of the sectors. For example, there are 3 required physical channels of service type 1 in a sector, 3 utility requests of the sector (i.e. SU requests) mapped with the QoS requirement of service type 1 thus be transformed. Subsequently, the utility requests of each of the sector in the coverage area of an AP may be transmitted by this AP to the server 100 via the wired backhaul 101.

It should be noted that, each of the APs AP1~APn may transmit the channel request data every, for example but not limited to, 2 seconds or a second, and those having ordinary skills in the art may modify the transmit duration for the design requirement to implement the present invention.

In Step S250, each of the APs AP1~APn receives resource allocation information associated with the channel request data from the server, wherein the resource allocation information comprises an allocated result of physical channels and transmission power configurations. Specifically, after the server 100 receives the utility requests of the sectors of the APs AP1~APn, the server 100 may perform, for example but not limited to, channel and power allocation, computing load balancing, and/or spectrum resource sharing. For example, the channel and power allocation may process the utility requests of the sectors from all APs AP1~APn in its coverage area, and allocates the frequency bands (i.e. physical channels) available for the coverage area to the APs AP1~APn. One of the utility requests of the sectors may be assigned to an AP when its corresponding SINR requirement is satisfied. The utility requests of the sectors in the overlapped coverage range of APs may be allocated to another AP, considering the relative interferences among the utility requests of the sectors and their individual SINR requirements, even if they are issued from different APs. Besides, the transmission power configuration on each of the allocated physical channels of each of the AP1~APn may be calculated, so as to prevent the co-channel interference. The server 100 may transmit the above mentioned allocated result (i.e. resource allocation information) to each of the APs AP1~APn, respectively, then each of the APs AP1~APn may receive these allocated result.

In Step S270, each of the APs AP1~APn allocates the physical channels to the channel access requests of the UEs (e.g. UE1, . . . , UEm) according to the QoS requirements of the channel access requests of the UEs and the resource allocation information. In this embodiment, each of the APs AP1~APn assigns the physical channels with the transmission power configurations to the UEs in the manner of time division multiplexing (TDM).

Specifically, taking a RB as the unit of resource allocation for an example, the major dissimilarity to the traditional utility-based resource scheduling problems is the discrete feasible allocation rates. In the following formulation, it is assumed that the number of allocated physical channels of capacity $C_i$ is $\hat{m}_i$, wherein i=1, . . . , M. Let $X_{i,j}^{k,q}(l)$ be an indicator of RB allocation, wherein i is the service type index, j is the flow (or UE) index of the specific service type, k is the physical channel (PCH) category index, and q is the physical channel index of that specific PCH category. Besides, l represents the RB index. Based on the assumption of communication system 10, it is known that $i \in I_M$, $k \in I_M$, and $l \in I_Z$, for a specific service type i and PCH category k, $j \in I_{n_i}$ and $q \in I_{M_k}$, wherein for convenience, an index set of {1, . . . , M} is denoted by $I_M$ in the sequel. $X_{i,j}^{k,q}(l)$ is 1 if RB l of the q-th channel with capacity $C_k$ is allocated to the session j of service type i, otherwise $X_{i,j}^{k,q}(l)$ is 0. In other words, $X_{i,j}^{k,q}(l)$ is 1 if RB l of the q-th physical channel with capacity $C_k$ is allocated to user (i,j), wherein j-th UE (or flow) in i-th service type is denoted as user (i,j) afterwards. For example, FIG. 4 is an example illustrating the operations of RB allocation for user (i,j) according to the embodiment of the invention. Frame 401 is assigned for the first allocated physical channel with capacity $C_1$, and two allocated physical channels with capacity $C_1$ are allocated. Note that the physical channels allocated to an AP from the server are shared by all its served UEs (or flows) in the manner of time division multiplexing.

Next, each of the APs AP1~APn maximizes the sum utility corresponding to the channel access requests of the UEs according to the physical channels and the QoS requirements of the channel access requests of the UEs, so as to allocate the physical channels to the UEs according to the maximized result. Specifically, the user-level downlink scheduling problem is formulated as follows, wherein $U_i(x)$ is utility function in service type i.

$$\arg\max_{X_{i,j}^{k,q}(l)} \left[ \sum_{i=1}^{M} \sum_{j=1}^{n_i} U_i \left( \frac{t}{T} \sum_{k=1}^{M} \sum_{q=1}^{\hat{m}_k} \sum_{l=1}^{z} X_{i,j}^{k,q}(l) C_k \right) \right] \quad (3)$$

subject to 
$$\begin{cases} \sum_{k=1}^{M} \sum_{q=1}^{\hat{m}_k} \sum_{l=1}^{z} X_{i,j}^{k,q}(l) \leq 1, \forall (i,j) \\ \sum_{i=1}^{M} \sum_{j=1}^{n_i} \sum_{k=1}^{M} \sum_{q=1}^{\hat{m}_k} \sum_{l=1}^{z} X_{i,j}^{k,q}(l) \leq z \left( \sum_{k=1}^{M} \hat{m}_k \right) \\ \sum_{k=1}^{M} \sum_{q=1}^{\hat{m}_k} \left( \sum_{l=1}^{z} X_{i,j}^{k,q}(l) C_k t \right) / r_i T \geq \alpha, \forall (i,j) \\ r_i T / \sum_{k=1}^{M} \sum_{q=1}^{\hat{m}_k} \left( \sum_{l=1}^{z} X_{i,j}^{k,q}(l) C_k t \right) \geq \beta, \forall (i,j), \\ 0 \leq \beta \leq 1 \end{cases}$$

The first constraint means that a specific flow (or UE) cannot be allocated more than one RBs on different physical channels at the same time. For example, FIG. 5A~5D are examples illustrating the resource allocation with four constraints according to the embodiment of the invention. Referring to FIG. 5A, assuming that each TTI has three RBs (i.e., z=3). For the considered UE (or flow), the allocations of the first RB for the 1-st physical channel with capacity $C_2$ (i.e., RB 511) and the second RB for the 2-nd physical channel with capacity $C_2$ (i.e., RB 513) are feasible; while simultaneously allocating the third RB for the 1-st physical channel with capacity $C_2$ (i.e., RB 515) and the third RB for the 3-rd physical channel with capacity $C_2$ (i.e., RB 517) to the UE (or flow) is infeasible.

The second constraint says that the RBs allocated to the served flow per TTI (i.e. the time duration of a frame, which is denoted as T) cannot exceed the allocated resources. For example, referring to FIG. 5B, there are 2 allocated physical channels with capacity $C_1$ and each TTI has 3 RBs, and two UEs which are named UE (i,j) and UE(i',j'). Assuming that the AP has already allocated three RBs to UE(i,j), that is, $X_{i,j}^{1,1}(1)=X_{i,j}^{1,1}(3)=X_{i,j}^{1,2}(2)=1$ (RB 521, 525, and 523) in FIG. 5B. It is definitely that $X_{i',j'}^{1,1}(1)=X_{i',j'}^{1,1}(3)=X_{i',j'}^{1,2}(2)=0$ (RB 527, 528, and 529), and one feasible RB allocation to UE(i',j') is $X_{i',j'}^{1,1}(1)=X_{i',j'}^{1,1}(3)=X_{i',j'}^{1,2}(2)=_1$ (RB 522, 524, and 526), as shown in FIG. 5C.

The third constraint is to provide each flow a minimum service guarantee. Each flow shares the granted resources at least with the proportion of a. In this embodiment, each of the APs AP1~APn determines a service guarantee degree (i.e. α), wherein the service guarantee degree is based on the ratio of the allocated bandwidth of all capacities of the allocated physical channels to the required physical channel bandwidth of each of the channel access requests of the UEs (e.g. UE1, . . . , UEm), and each of the APs AP1~APn allocates the physical channels for the channel access requests of the UEs according to the service guarantee degree. In other words, the setting of α should be less or equal to the ratio of the allocated resources (i.e. allocated bandwidth) to the requested resources (i.e. required physical channel bandwidth), that is, $$0 \leq \alpha \leq \Sigma_{k=1}^{M} C_k \hat{m}_k zt / \Sigma_{i=1}^{M} n_i r_i T \quad (4)$$

For example, referring to FIG. 5C, the ratio of required physical channel bandwidth 530 of a flow and the allocated bandwidth 535 is α.

The last constraint says that, per RB utilization must be larger than a predefined threshold β, and β is between [0, 1]. In this embodiment, each of the APs AP1~APn determines a utilization degree, wherein the utilization degree (i.e. β) is based on the ratio of the required physical channel bandwidth of each of the channel access requests of the UEs (e.g. UE1, . . . , UEm) to the allocated bandwidth of all capacities of the allocated physical channels, and each of the APs AP1~APn allocates the physical channels for the channel access requests of the UEs according to the utilization degree. This is to avoid the case of allocating high capacity channels to low rate flows for resulting a high sum utility, and thus waste resources seriously. For example, referring to FIG. 5D, the ratio of the allocated bandwidth 545 and required physical channel bandwidth 540 of a flow is β.

It should be noted that, for the design requirement of implementing the embodiment of the invention, those having ordinary skills in the art may allocate the physical channels using the service guarantee degree, the utilization degree, or the both, and this invention is not limited thereto.

Figure 6A:
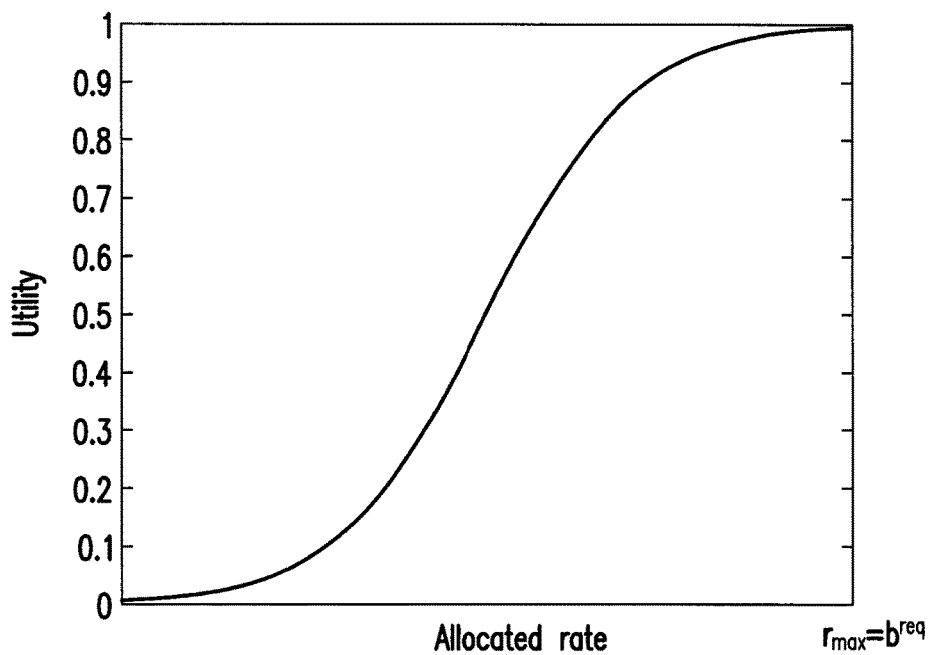
FIGS. 6A and 6B are examples illustrating utility functions of real time (RT) and non-real time (NRT) applications.
Figure 6B:

Furthermore, utility functions are used in this embodiment to evaluate the degree to which allocated resource satisfies QoS requirements (e.g. throughput, delay, or bandwidth, and etc.) of the channel access requests of the UEs. For example, FIGS. 6A and 6B are examples illustrating utility functions of real time (RT) and non-real time (NRT) applications. If the allocated rate (i.e. the capacity of physical channel) reaches the requirement of bandwidth $b^{req}$, the value of the utility would be 1. Voice over IP (VoIP) and video streaming are examples of RT applications as shown by the utility function of FIG. 6A, and e-mail and web browsing are classified into the NRT application as shown by the utility function of FIG. 6B. The biggest difference between RT and NRT applications is that RT applications have a minimum bandwidth requirement to allow sufficient performance of applications. In other words, non-real time applications are delay tolerant.

Figure 7:
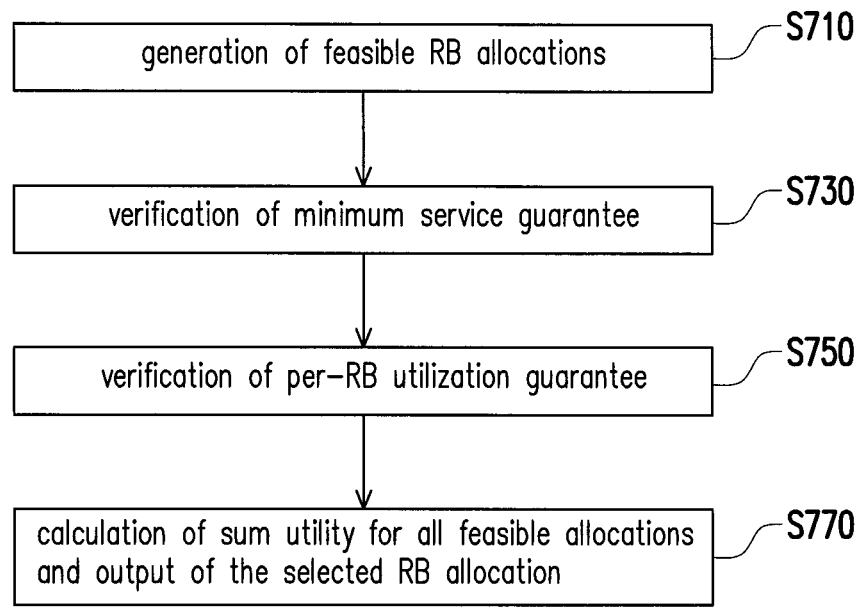
FIG. 7 is a flow chart illustrating an optimal resource scheduling method according to an embodiment of the invention.

In addition, the detailed operations of the optimal resource scheduling are elaborated as following steps. FIG. 7 is a flow chart illustrating an optimal resource scheduling method according to an embodiment of the invention. The step S710 is to generate feasible RB allocations. Generating $P(n_i,m_k)^z$ combination of RB allocations as the following equation (5):

$$P(n_i, m_k) \triangleq (\Sigma_{i=1}^{M} n_i)! / (\Sigma_{i=1}^{M} n_i - \Sigma_{k=1}^{M} \hat{m}_k)! \Pi_{k=1}^{M} \hat{m}_k! \quad (5)$$

Also, let Φ be the set of all combinations of RB allocations, and $\phi_u$ be an arbitrary combination of RB allocations.

The step S730 is to verify the constraint of minimum service guarantee. Let Φ be the set of the feasible RB allocations that guarantee each served flow having the minimum services. That is the following equation (6):

$$\hat{\Phi} = \Phi / \{ \phi_u | \exists f_{i,j} \in \phi_u, \Sigma_{k=1}^{M} \Sigma_{q=1}^{\hat{m}_k} (\Sigma_{l=1}^{z} X_{i,j}^{k,q}(l) C_k t) < \alpha r_i T \} \quad (6)$$

The step S750 is to verify the constraint of per-RB utilization guarantee. Let $\beta_{k,q,l}$ be the RB utilization of $s_{k,q,l}$. Then, the equation (6) may become the following equation (7):

$$\hat{\Phi}=\hat{\Phi}/\{\phi_u | \exists f_{i,j} \in \phi_u, \beta_{k,q,l} < \beta\} \qquad (7)$$

Subsequently, the step S770 is to calculate the sum utility for all feasible allocations and output the selected RB allocation. That is, $$\underset{\phi_u}{\mathrm{argmax}}\left\{\sum_{i=1}^{M}\sum_{j=1}^{n_i} U_i\left(\frac{\min\left\{t\sum_{k=1}^{M}\sum_{q=1}^{\hat{m}_k}\sum_{l=1}^{z}X_{i,j}^{k,q}(l)C_k, b_{i,j}\right\}}{T}\right)\middle|\phi_u \in \hat{\Phi}\right\}, \qquad (8)$$

where $b_{i,j}$ is the required transmission rate of the j-th flow for the i-th service type.

In the embodiment, it is assumed that each UE equips exact one antenna. Therefore, a flow (or an UE) cannot be simultaneously allocated more than one RB on different physical channels. Considering both the first time RB allocations of all granted channels and channel homogeneity, among the $\Sigma_{k=1}^M \hat{m}_k$ RBs, there are $P(n_i,m_k)$ feasible RB allocations. The remaining RBs have the same feasible combinations. As a result, the complexity of the above procedure is upper bounded by $P(n_i,m_k)$.

Furthermore, in another embodiment, a gradient-based user scheduling (US) algorithm is described as follows. The scheduling algorithm aims at not only guaranteeing the minimum services to flows (or USs) but also improving the per-RB utilization. Conceptually, given the utility functions of the flows in a specific sector, allocated physical channels and capacities of the physical channels, minimum service guarantee, and per-RB utilization degree, an AP (e.g. AP1, ..., APn) first performs RB allocation to each flow to achieve minimum service guarantee. Followed, the remaining RBs are allocated to flows to further improve the sum utility. Parameters used in the scheduling algorithm include:

(1) Service guarantee degree ($\alpha$): the minimum percentage of requested resources granted to a flow. The setting is related to the channel grants from the server 100 and the total resource demands (i.e. $0 \le \alpha \le \Sigma_{k=1}^{M}C_k \hat{m}_k zt/\Sigma_{i=1}^{M} n_i r_i T$). The scheduling algorithm has a high degree of freedom to achieve a high utility performance upon a small degree setting.

(2) Per-RB utilization degree ($\beta$): to achieve high system throughput performance, an AP will allocate a RB to a flow (or an UE) if this flow can utilize $\beta$ portion of the RB capacity, wherein $\beta$ is within [0, 1].

(3) Utility gradient $\Delta_{i,j}$: the value of utility increment per bit upon rate promotion. Assuming that the current rate and the promoted rate of flow $f_{i,j}$ is $r_{i,j}$ and $r'_{i,j}$, respectively. The definition of a flow's utility gradient is $$\Delta_{i,j} = \frac{U_i(r'_{i,j}) - U_i(r_{i,j})}{r'_{i,j} - r_{i,j}}, \; r'_{i,j} \le r_{i,j}^{max} \qquad (9)$$

This parameter is adopted as the scheduling metric. That is, the AP chooses the flow which has the largest utility gradient value to do RB allocation.

(4) Scheduling priority ($w_{i,j}$): it is inversely proportional to the average utility of a flow. Let $r_{i,j,k}$ represent the allocated rate of $f_{i,j}$ in the k-th TTI, and the embodiment measure K TTIs. The flow's scheduling priority is $$w_{i,j} \triangleq \frac{1}{\sum_{k=1}^{K} U_i(r_{i,j,k})}.$$

Scheduling priority is used for tie break, when multiple flows have the equal utility gradient.

Figure 8:
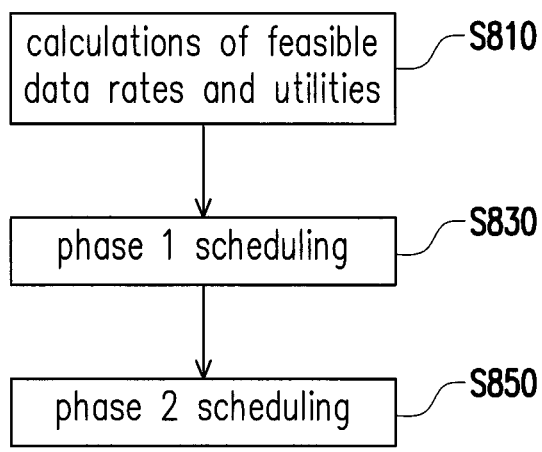
FIG. 8 is a flow chart illustrating a heuristic resource scheduling method according to the embodiment of the invention.

Next, FIG. 8 is a flow chart illustrating a heuristic resource scheduling method according to the embodiment of the invention. The step S810 is to calculate the feasible data rates and utilities. Since the resource unit for scheduling in LTE-A systems is RB, the utility function of a flow is discrete. Before performing scheduling operations, an AP first derives the feasible data rates and the corresponding flows. Specifically, assuming x channels are granted for a specific sector of the AP, and their RB rates are represented as $C=[C_1, C_2, \ldots, C_x]$. Consequently, the feasible RB rates of a flow, say $f_{i,j}$, are $$\Theta\left(\begin{array}{c} C \\ \le r_i^{max} \end{array}\right),$$

where the notations $\Theta(.)$ and $\le r_i^{max}$ indicate, respectively, the combinations and all feasible data rates being less or equal to the flow's maximum data rate. Further, the corresponding utilities are $$U\left(\Theta\left(\begin{array}{c} C \\ \le r_i^{max} \end{array}\right)\right).$$

Next, the step S830 is phase 1 scheduling. On the one hand, aiming at providing minimum service guarantees to the served flows. To flow $f_{i,j}$, the AP searches the feasible RB combinations which meet both the desired RB rate and RB utilization requirement. If there are several combinations, the AP chooses the one which utilizes the least number of RBs. Followed, the AP updates the corresponding utility and the remaining available RBs.

Subsequently, the step S850 is phase 2 scheduling. On the other hand, aiming at increasing the sum utility through allocating the remaining resources to the served flows. Specifically, if there still are unallocated RBs, the AP estimates the utility gradients of all flows based on utility gradient $\Delta_{i,j}$ (3) through promoting their RB rates and sorts all flows in decreasing order of utility gradient. In the case that multiple flows have the same utility gradient, their service order is determined by the scheduling priority. For the sorted flows, similarly to the step S830, the AP searches the feasible RB combinations, chooses the one that utilizes the least number of RBs, and performs parameter updates. The AP keeps performing this step till either all RBs have been allocated or none of flows can be promoted. The former is intuitive; the latter is due to the AP cannot combine the available RBs to have the desired promoted feasible RB rate.

In table (2), the performance of sum utility versus various settings of $\alpha$ and $\beta$ is shown for an AP (e.g. AP1, ..., or APn) of service type M, wherein M is 4. The four physical channel capacities and data rates (i.e. transmission rate requirements) are [240, 720, 1440, 2160] in kbits/RB and

[120, 400, 800, 1800] in kbits/TTI, respectively. Assuming the channel grant probability is 0.6, and 3~6 flows are generated randomly in each sector. Next, according to Y. Chen, T. Farley, and N. Ye, "QoS requirements of network applications on the internet," *Information Knowledge Systems Management*, vol. 4, pp. 55-76, 2004, assuming the constants of utility functions for video, voice, FTP, and web browsing flows are defined herein as (a1=50, a2=8), (a1=140, a2=12), k=5, and k=4.5, respectively. Besides, each TTI consists of 5 RBs, and the simulation time is 20 TTI. At first, set β to 0.3 and vary α from 0.2 to 0.8. On one hand, as α increases from 0.2 to 0.8, both the optimal and the heuristic approaches have more than 20% decreases in the sum utility. The reason is that only 20% of the RBs are allocated to the flows that have high utility gradients to improve the sum utility. On the other hand, more simulations are performed to investigate the impact of β on utility performance. As β increases from 0.2 to 0.8, the sum utility has about 20% decreases for the optimal approach, while the heuristic approach has more than 50% decreases. Though some flows have high utility gradients, the resources cannot be granted to those flows due to the constraint of minimum per-RB utilization.

TABLE 2

| | α | | | β | | |
|---|---|---|---|---|---|---|
| | 0.2 | 0.5 | 0.8 | 0.2 | 0.5 | 0.8 |
| Optimal | 0.766 | 0.759 | 0.578 | 0.766 | 0.664 | 0.611 |
| heuristic | 0.617 | 0.611 | 0.479 | 0.716 | 0.467 | 0.338 |

Furthermore, after each of the APs AP1~APn performs the resource allocation in step S270 of FIG. 2, each of the APs AP1~APn transmits the wireless data corresponding to the channel access requests of the UEs using the transmission power configurations on each of the allocated physical channels. In other words, the transmission power configuration is the transmit power of AP. Thus, the wireless data transmitted by each of the APs AP1~APn may not be affected by co-channel interferences.

To sum up, the AP and the communication system for resource allocation, disclosed in the embodiments of this invention, are configured to collect and aggregate the channel access requests of UEs, and transform the channel access requests of UEs into several utility requests of sectors (SU requests) in each of the sectors according to the corresponding QoS requirement. After the AP receives the allocation information of available physical channel and transmission power configurations on the physical channels, the AP determines whether to allocate resource blocks for the channel access requests of the UEs from the allocated physical channels assigned by the server. Accordingly, making use of dynamic channel and power allocation, and interference control inside an SON of femto APs, the percentage of granted channel access requests can reach 75% in average even with no explicit cellular planning inside the coverage area of an SON. Moreover, the user scheduling of the invention achieves the minimum service guarantee for served flows as well as maximizes the sum utilities. These results clearly demonstrate the feasibility of randomly deploying large numbers of femto APs in a wireless MAN based on the concept of SON.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An access point (AP), comprising:
a transceiver for transmitting and receiving wireless data;
a network connection unit for transmitting and receiving control data;
a processing circuit coupled to the transceiver and the network connection unit and is configured for:
receiving a plurality of channel access requests of a plurality of UEs using the transceiver;
transmitting each of a plurality of sector utility requests transformed from the plurality of channel access requests of the plurality of UEs in a sector according to quality of service (QoS) requirements of the plurality of channel access requests of the plurality of UEs and location data of the plurality of UEs using the network connection unit, wherein the location data of each of the UEs comprises a distance and an angle between each of the UEs and the AP;
receiving resource allocation information associated with the channel request data using the network connection unit, wherein the resource allocation information comprises an allocated result of a plurality of physical channels and a plurality of transmission power configurations;
allocating the plurality of physical channels to the plurality of UEs according to the location data of the plurality of UEs, the plurality of sector utility requests to which the plurality of UEs belong, and the QoS requirements of the plurality of channel access requests of the plurality of UEs and the resource allocation information;
transforming the plurality of channel access requests of the plurality of UEs into the plurality of sector utility requests according to the location data of the plurality of UEs and the QoS requirements of the plurality of channel access requests of the plurality of UEs;
wherein number of the sector utility requests is N, N is a positive integer, and the sectors to which the N sector utility requests correspond comprise a plurality of first sectors and a plurality of second sectors, the AP is surrounded by the first sectors, and the first sectors and the AP are surrounded by the second sectors, and
wherein the processing circuit is further configured for:
determining a service guarantee degree, wherein the service guarantee degree is based on a ratio of an allocated bandwidth of all capacities of the plurality of physical channels to a required physical channel bandwidth of each of the plurality of channel access requests of the plurality of UEs; and
allocating the plurality of physical channels for the plurality of channel access requests of the plurality of UEs according to the service guarantee degree.
2. The AP according to claim 1, wherein the plurality of channel access requests of the plurality of UEs are corresponded to M service types, M is a positive integer, and the processing circuit is further configured for:
mapping transmission rate requirements of the M service types corresponding to the QoS requirements of the plurality of channel access requests of the plurality of UEs to capacities of the plurality of physical channels; and calculating numbers of required physical channels of the M service types in each of the sectors as the numbers of the plurality of sector utility requests according to mapped results.

3. The AP according to claim 2, wherein the processing circuit is further configured for:
calculating a bandwidth requirement of each of the M service types in each of the sectors according to the transmission rate requirements of the M service types and amounts of the plurality of the channel access requests of the plurality of the UEs for the M service types of each of the sectors;
calculating an offered capacity of each of the capacities of the plurality of physical channels mapped with the each of the M service types in each of the sectors; and
calculating the numbers of required physical channels of the each of M service types of each of the sectors in an order of the M service types according to the bandwidth requirement of each of the M service types and the offered capacity of each of the capacities of the plurality of physical channels mapped with the each of the M service types, wherein the order of the M service types is arranged according to the transmission rate requirements of the M service types.

4. The AP according to claim 2, wherein the processing circuit is further configured for:
assigning the plurality of the allocated physical channels with the plurality of transmission power configurations to the plurality of UEs in the manner of time and frequency division multiplexing.

5. The AP according to claim 4, wherein the processing circuit is further configured for:
determining a utilization degree, wherein the utilization degree is based on a ratio of the required physical channel bandwidth of each of the plurality of channel access requests of the plurality of UEs to the allocated bandwidth of all capacities of the plurality of physical channels; and
allocating the plurality of physical channels for the plurality of channel access requests of the plurality of UEs according to the utilization degree.

6. The AP according to claim 1, wherein the processing circuit is further configured for:
maximizing a sum utility corresponding to the plurality of channel access requests of the plurality of UEs according to the plurality of physical channels and the QoS requirements of the plurality of channel access requests of the plurality of UEs, allocating the plurality of physical channels to the plurality of UEs according to a maximized result.

7. The AP according to claim 1, wherein the processing circuit is further configured for:
transmitting the wireless data corresponding to the plurality of channel access requests of the plurality of UEs using the plurality of transmission power configurations on each of the plurality of the allocated physical channels.

8. A communication system, comprising:
a plurality of UEs;
a server; and
a plurality of access points (APs), coupled to the server, wherein each of the plurality of APs is configured to receive a plurality of channel access requests of the plurality of UEs from the plurality of UEs, transmit each of a plurality of sector utility requests transformed from the plurality of channel access requests of the plurality of UEs in a sector according to quality of service (QoS) requirements of the plurality of channel access requests of the plurality of UEs and location data of the plurality of UEs to the server, receive the resource allocation information associated with the channel request data from the server, wherein the resource allocation information comprises an allocated result of a plurality of physical channels and a plurality of transmission power configurations, and allocate the plurality of physical channels to the plurality of UEs according to the location data of the plurality of UEs, a plurality of sector utility requests to which the plurality of UEs belong, and the QoS requirements of the plurality of channel access requests of the plurality of UEs and the resource allocation information,
wherein the location data of each of the UEs comprises a distance and an angle between each of the UEs and the AP,
wherein the channel request data comprises a plurality of sector utility requests, and each of the plurality of APs is configured to transform the plurality of channel access requests of the plurality of UEs into the plurality of sector utility requests according to the location data of the plurality of UEs and the QoS requirements of the plurality of channel access requests of the plurality of UEs,
wherein the number of the sector utility requests is N, N is a positive integer,
the sectors to which the N sector utility requests correspond comprise a plurality of first sectors and a plurality of second sectors, the AP is surrounded by the first sectors, and the first sectors and the AP are surrounded by the second sectors, and
wherein each of the plurality of APs is configured to determine a service guarantee degree, wherein the service guarantee degree is based on a ratio of an allocated bandwidth of all capacities of the plurality of allocated physical channels to a required physical channel bandwidth of each of the plurality of channel access requests of the plurality of UEs, and allocate the plurality of physical channels for the plurality of channel access requests of the plurality of UEs according to the service guarantee degree.

9. The communication system according to claim 8, wherein the plurality of channel access requests of the plurality of UEs is corresponded to M service types, M is a positive integer, and the each of the plurality of APs is configured to map the transmission rate requirements of the M service types corresponding to the QoS requirements of the plurality of channel access requests of the plurality of UEs to the capacities of the plurality of physical channels, and calculate the numbers of the required physical channels of the M service types in each of the sectors as the numbers of the plurality of sector utility requests according to the mapped results.

10. The communication system according to claim 9, wherein each of the plurality of APs is configured to calculate a bandwidth requirement of each of the M service types in each of the sectors according to the transmission rate requirements of the M service types and amounts of the plurality of the channel access requests of the plurality of the UEs for the M service types of each of the sectors, calculate an offered capacity of each of the capacities of the plurality of physical channels mapped with the each of the M service types in each of the sectors, and calculate the numbers of required physical channels of the-each of M service types in an order of the M service types according to the bandwidth requirement of each of the M service types and the offered capacity of each of the capacities of the plurality of physical channels mapped with the each of the M service types, wherein the order of the M service types is arranged according to the transmission rate requirements of the M service types.

11. The communication system according to claim 9, wherein each of the plurality of APs is configured to assign the plurality of the allocated physical channels with the plurality of transmission power configurations to the plurality of UEs in the manner of time and frequency division multiplexing.

12. The communication system according to claim 11, wherein each of the plurality of APs is configured to determining a utilization degree, wherein the utilization degree is based on a ratio of the required physical channel bandwidth of each of the plurality of channel access requests of the plurality of UEs to the allocated bandwidth of all capacities of the allocated plurality of physical channels, and allocate the plurality of physical channels for the plurality of channel access requests of the plurality of UEs according to the utilization degree.

13. The communication system according to claim 8, wherein each of the plurality of APs is configured to maximize a sum utility corresponding to the plurality of channel access requests of the plurality of UEs according to the plurality of physical channels and the QoS requirements of the plurality of channel access requests of the plurality of UEs, and allocate the plurality of physical channels to the plurality of UEs according to a maximized result.

14. The communication system according to claim 8, wherein each of the plurality of APs is configured to transmit the wireless data corresponding to the plurality of channel access requests of the plurality of UEs using the plurality of transmission power configurations on each of the plurality of the allocated physical channels.

15. An access point (AP), comprising:
a transceiver for transmitting and receiving wireless data;
a network connection unit for transmitting and receiving control data;
a processing circuit coupled to the transceiver and the network connection unit and is configured for:
  receiving a plurality of channel access requests of a plurality of UEs using the transceiver;
  transmitting a channel request data transformed from the plurality of channel access requests of the plurality of UEs according to quality of service (QoS) requirements of the plurality of channel access requests of the plurality of UEs using the network connection unit;
  receiving resource allocation information associated with the channel request data using the network connection unit, wherein the resource allocation information comprises an allocated result of a plurality of physical channels and a plurality of transmission power configurations;
  allocating the plurality of physical channels to the plurality of UEs according to the QoS requirements of the plurality of channel access requests of the plurality of UEs and the resource allocation information
  determining a service guarantee degree, wherein the service guarantee degree is based on a ratio of an allocated bandwidth of all capacities of the plurality of physical channels to a required physical channel bandwidth of each of the plurality of channel access requests of the plurality of UEs; and
  allocating the plurality of physical channels for the plurality of channel access requests of the plurality of UEs according to the service guarantee degree.

* * * * *